ized=United States Patent [19]

Marchionni et al.

[11] Patent Number: 5,777,291
[45] Date of Patent: Jul. 7, 1998

[54] PROCESS FOR PREPARING PEROXIDIC PERFLUOROPOLYETHERS

[75] Inventors: Giuseppe Marchionni, Milan; Pier Antonio Guarda, Nole, both of Italy

[73] Assignee: Ausimont S.p.A., Milan, Italy

[21] Appl. No.: 799,260

[22] Filed: Feb. 13, 1997

[30] Foreign Application Priority Data

Feb. 14, 1996 [IT] Italy ................. MI96 A 0280

[51] Int. Cl.$^6$ ................. C07F 1/00; C07C 21/00; C07C 409/00
[52] U.S. Cl. ................. 204/157.6; 204/157.92; 568/560; 568/561
[58] Field of Search ................. 204/157.6, 157.92; 568/560, 561

[56] References Cited

U.S. PATENT DOCUMENTS 3,715,378  2/1973  Sianesi et al. ................. 260/463
3,847,978  11/1974  Sianesi et al. ................. 260/535 H
4,451,646  5/1984  Sianesi et al. ................. 528/401
4,859,299  8/1989  Kobayashi et al. ................. 204/157.92
5,354,922  10/1994  Marchionni et al. ................. 568/560

FOREIGN PATENT DOCUMENTS 695775  2/1996  European Pat. Off. .

*Primary Examiner*—Arun S. Phasge
*Assistant Examiner*—Edna Wong
*Attorney, Agent, or Firm*—Nikaido Marmelstein Murray & Oram LLP

[57] ABSTRACT

Tetrafluoroethylene oxidation process at temperatures comprised between −80° C. and −40° C. in the presence of UV radiations and pentafluoropropane as solvent.

9 Claims, No Drawings

PROCESS FOR PREPARING PEROXIDIC PERFLUOROPOLYETHERS

BACKGROUND OF THE INVENTION

1. Field of the Invention

The present invention relates to a process for preparing peroxidic perfluoropolyethers obtained by photooxidation of tetrafluoroethylene in the presence of solvents.

More particularly it refers to a process which does not utilize chlorofluorocarbon solvents which, as known, have a dangerous impact on the ozone (ODP) and cause greenhouse effect (GWP).

2. Description of the Related Art

It is well known that TFE photooxidation processes at low temperature to produce peroxidic perfluoropolyethers are industrially carried out in CFC solvents, for instance R12. According to international agreements relating to reduction and elimination of CFC from the market, the need to find substitutive solvents was felt.

Said substitutive solvents must allow to carry out the synthesis so as to obtain results comparable to the present solvents, in particular with respect to R12 ($CF_2Cl_2$ dichlorodifluoromethane) which is the most utilized solvent for its optimal performances.

The solvent must not produce chain transfer, since, if desired, one must be able to obtain also a control on the molecular weight. Moreover a substitutive solvent of R12 must allow the obtainment of a polymer having a low content of peroxidic units (PO) with a good productivity. An ideal solvent is the one which allows to obtain performances similar to those obtainable with R12 by operating in the same conditions of reactor volume, gas flow-rate, power of the radiant lamp and reaction temperature.

It is known indeed that in the photooxidation process of tetrafluoroethylene (TFE) in the presence of CFC solvents, polymers with a lower PO can be obtained if the radiant power of the UV lamp is increased or if one works at higher temperatures, the TFE flow-rate and the reactor volume being equal. However the increase of radiant power involves higher process costs and the temperature increase implies lower yields.

Therefore the substitutive solvents are to be considered with the same radiant power, reactor configuration, temperature and flow-rate of the reactants. An optimal solvent will be the one which gives the highest productivity with the lowest PO with the same conditions.

In the patents of the art, as solvents used in the tetrafluoroethylene photooxidation, are especially mentioned specific chlorofluorocarbon or perfluorinated solvents, optionally containing atoms of oxygen and CFC are prevailingly used in the synthesis as preferred solvents. See for instance patents U.S. Pat. No. 4,451,646, U.S. Pat. No. 5,354,922, U.S. Pat. No. 3,847,978 and U.S. Pat. No. 3,715,378.

In all the patents of the art no indication and no teaching is found on the substitutive solvents of CFC 12 or of CFC in general, which allow to draw a trend on the choice of a solvent capable of giving results similar to R12 in PO and productivity terms, the radiant power, the reactor configuration, the reaction temperature and the reactants flow-rate being equal.

SUMMARY OF THE INVENTION

The Applicant has unexpectedly and surprisingly found a specific solvent not containing chlorine which is capable of giving a polymer with a low content of peroxidic units (PO) and with good productivity, even if compared to those obtained with R12. It has to be noticed that, as already said, it will not be possible any longer to utilize CFC, among which R12, in industrial processes owing to the ODP and GWP environmental problems indicated above.

DESCRIPTION OF THE PREFERRED EMBODIMENTS

The Applicant has lately carried out an experimentation from which it results that the solvent is not indifferent to the reaction.

Tests carried out by the Applicant with various perfluorinated solvents have shown that the synthesis of peroxidic perfluoropolyethers is possible if a particular type of perfluorinated solvent, as defined hereinunder, is utilized. It is to be noticed indeed that, the conditions being equal, with the solvent of the inventions polymers are obtained which have a peroxidic content (PO) and productivity closer to those obtained in the solvent R12. The other perfluorinated solvents, for instance those reported in the comparative examples, do not allow to obtain PO and productivity values comparable to those obtainable with the solvent of the invention.

With the comparative perfluorinated solvents, indeed, if a polymer with the same PO as that obtained with the solvent of the invention is desired, one must operate with lower olefins flow-rates, thus obtaining lower productivity. Obviously this represents a remarkable drawback from the industrial point of view.

Object of the present invention is a tetrafluoroethylene oxidation process at temperatures comprised between $-80°$ C. and $-40°$ C., preferably between $-70°$ C. and $-50°$ C., in the presence of UV radiations and perfluoropropane as solvent.

Tests carried out by the Applicant have shown, for instance, that if the reaction is carried out at $-50°$ C. in a 0.5 l photochemical reactor with a 150 W mercury high pressure lamp and with a tetrafluoroethylene flow-rate of 6.0 Nl/h, in the R12 solvent, a polymer having PO=1.66 is obtained. By operating under the same conditions, with the solvent of the invention a PO of 2.09 is obtained; by operating with the perfluoroheptane solvent a PO of 3.58 is obtained and by operating with perfluoroethers having a low molecular weight (bp=$55°$ C.) a PO of 4.3 is obtained.

From these examples it appears clear that inside the class of perfluorinated solvents, the solvent of the invention allows to obtain results comparable to those of R12.

If for instance in R12 a PO equal to that obtained with perfluoropropane (PO=2.09) is desired, as indicated above, one must operate with a tetrafluoroethylene flow-rate equal to 9.0 Nl/h. A PO of 2.02 and a specific productivity of polymer equal to 47 g/h/l are thus obtained in R12, while in perfluoropropane with a PO of 2.09 a specific productivity of 39 g/h/l is obtained.

The used radiation, the oxygen and TFE flow-rate are those well known in the art of CFC solvents and are described for instance in U.S. Pat. No. 3,715,378, incorporated herein by reference.

The obtained polymers have the following general formula:

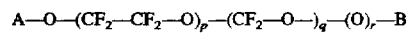

wherein the terminals groups A and B can be equal to or different from each other and comprise —$CF_3$, —COF, —CF$_2$COF, —CF$_2$X wherein X indicates a radicalic group deriving from the type of the transfer agent utilized, for instance it can be F, Cl, etc.; the p, q and r indexes equal to or different from each other are integers, the sum p+q is a number comprised between 2 and 1000, preferably 10 and 400, the q/p ratio is comprised between 0.1 and 10, preferably between 0.2 and 5; the r/(p+q) ratio is such as to lead to a peroxidic perfluoropolyether having a PO generally lower than 4.5–5, preferably lower than 4, generally comprised between 1 and 3.5. The PO value is expressed as grams of active oxygen (16 atomic mass unit (amu)) per 100 grams of polymer.

The TFE concentration generally ranges between 0.005 and 1 mole per liter of solution, preferably 0.01–0.5 mole/l; therefore the TFE flow-rate is such as to give these concentrations.

The amount of oxygen utilized is sufficient to saturate the solution, generally one operates with an excess of oxygen with respect to TFE and the oxygen partial pressures are generally comprised between 0.1 and 2 atm, preferably 0.2 and 1.

The process of the invention, if desired, can be carried out in the presence of a chain transfer agent if a control of the molecular weight is desired. As transfer agents, well known in the art, one can mention for instance: fluorine, chlorine, chlorotrifluoroethylene (CTFE), etc.

According to the present invention, when it is mentioned the molecular weight, it is meant a number average molecular weight.

Peroxidic perfluoropolyethers can be then transformed into products without peroxidic oxygen by means of a thermal treatment at temperatures generally comprised between 100°–250° C. or by UV radiations, in the presence or not of solvents. The so obtained product can be submitted to fluorination treatment to obtain perfluoropolyether with perfluoroalkylic terminals.

Alternatively the peroxidic crude product can be submitted to chemical reduction and to successive transformation reactions to obtain functional products. See for instance U.S. Pat. No. 3,715,378. The chemical reduction is for instance carried out according to methods described in U.S. Pat. No. 4,451,646, 3,847,978. The derivative thus obtained in the form of salt of the carboxylic acid can be submitted to decarboxylation processes in the presence of hydrogen donor substances, among which glycols, water, etc., to obtain perfluoropolyethers having both terminals —OCF$_2$H. See for instance European patent application EP 95111906.4 in the name of the Applicant.

The following examples are given for illustrative purposes and are not limitative of the present invention.

EXAMPLE 1

A cylindric re actor for photosynthesis, innerly equipped with coaxial sheaths, containing a 150 W high pressure mercury lamp, cooled by recirculation of transparent fluid at UV radiations, equipped moreover of a refrigerant maintained at the temperature of −75° C. and of feed pipes for feeding reacting gas, is cooled at −50° C. and charged with 450 cc of perfluoropropane. 12.0 Nl/h of oxygen are fed and after few minutes the mercury lamp is turned on. 6.0 Nl/h of tetrafluoroethylene and 0.041 Nl/h of chlorine diluted in a stream of nitrogen of 2.4 Nl/h are then fed for the whole test (300 minutes) by maintaining the temperature at −50° C. At the end of the reaction the lamp is turned off, the reactants flows are closed and the solvent and the gaseous by-products are evaporated.

The oil remained after degassing results equal to 86.3 g, which corresponds to a specific productivity of 39 g/h/l. The PO results equal to 2.09 and the viscosity at 20° C. equal to 500 cst.

The $^{19}$F-NMR analysis confirms the following structure:

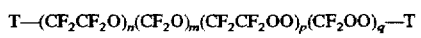

wherein T=OCF$_2$Cl, OCF$_2$CF$_2$Cl, OCF$_3$, OCF$_2$COF, OCOF.

The (p+n)/(q+m) ratio is equal to 1.36 and the n/m ratio is equal to 1.06. The average molecular weight calculated by the NMR is equal to 12000.

EXAMPLE 1B (comparative)

In the same reactor of Example 1 cooled at −50° C., 430cc of perfluoroheptane are introduced. 12.0 Nl/h of oxygen are fed and after few minutes the mercury lamp is turned on. 6.0 Nl/h of tetrafluoroethylene and 0.046 Nl/h of chlorine diluted in a stream of 2.4 Nl/h of nitrogen for the whole test (300 minutes) are then fed by maintaining the temperature at −50° C. When the reaction is over the lamp is turned off, the reactants flows are closed, the solution is discharged and the solvent and the reaction by-products are distilled. The oil remained results equal to 36.7 g which corresponds to a specific productivity of 17 g/h/l. The PO results equal to 3.58.

The $^{19}$F-NMR indicates a structure similar to the one reported in Example 1, with the same type of terminals. The (p+n)/(q+m) ratio results equal to 1.05 and the n/m one equal to 0.64.

EXAMPLE 1C (comparative)

In the same reactor of Example 1 cooled at −50° C., 430 cc of a mixture of perfluoropolyethers having a low molecular weight (bp=55° C.) are introduced. 12.0 Nl/h of oxygen are fed and after few minutes the mercury lamp is turned on. 6.0 Nl/h of tetrafluoroethylene and 0.046 Nl/h of chlorine diluted in a stream of 2.4 Nl/h of nitrogen for the whole test (300 minutes) are then fed by maintaining the temperature at −50° C. When the reaction is over the lamp is turned off, the reactants flows are closed, the solution is discharged and the solvent and the reaction by-products are distilled. The oil remained results equal to 59.5 g which corresponds to a specific productivity of 28 g/h/l. The PO results equal to 4.23. The $^{19}$F-NMR indicates a structure similar to the one reported in Example 1, with the same type of terminals. The (p+n)/(q+m) ratio results equal to 1.48 and the n/m one equal to 0.86.

EXAMPLE 1D (comparative)

In the same reactor of Example 1 cooled at −50° C., 440cc of dichlorodifluoromethane are introduced. 12.0 Nl/h of oxygen are fed and after few minutes the mercury lamp is turned on. 6.0 Nl/h of tetrafluoroethylene for the whole test (300 minutes) are then fed by maintaining the temperature at −50° C. When the reaction is over the lamp is turned off, the reactants flows are closed and the solvent and the reaction by-products are evaporated. The oil remained in the reactor, after degassing, results equal to 70.8 g which corresponds to a specific productivity of 32 g/h/l. The PO results equal to 1.66 and the viscosity at 20° C. equal to 350 cSt. The $^{19}$F-NMR indicates a structure similar to the one reported in Example 1, with the same type of terminals. The (p+n)/(q+m) ratio results equal to 0.81 and the n/m one equal to 0.67. The average molecular weight calculated by NMR is equal to 10300.

EXAMPLE 2

In the reactor of Example 1, 450 cc of perfluoropropane are introduced at the temperature of −50° C. One operates with the same procedure as in Example 1, by feeding 18.0 Nl/h of oxygen, 9.0 Nl/h of tetrafluoroethylene, 0.039 Nl/h of chlorine diluted in a current of 2.4 Nl/h of nitrogen. After 300 minutes of reaction 116 g of product are obtained (corresponding to a specific productivity of 52 g/h/l), having PO=2.80 and viscosity equal to 3300 cSt. The NMR analysis indicates a structure similar to that of example 1, with (p+n)/(q+m) ratio=1.82 e n/m=1.27 and molecular weight equal to 23600.

EXAMPLE 2A (comparative)

In the reactor of Example 1,440 cc of dichlorodifluoromethane are introduced at the temperature of −50° C. One operates with the same procedure as in Example 1, by feeding 18.0 Nl/h of oxygen and 9.0 Nl/h of tetrafluoroethylene for 300 minutes. 103.5 g of oil are obtained (corresponding to a specific productivity of 47 g/h/l), having PO=2.02 and viscosity equal to 1380 cSt. The NMR analysis indicates a structure similar to that of example 1, with (p+n)/(q+m) ratio=1.07 e n/m=0.84 and molecular weight equal to 17300.

EXAMPLE 3

In the reactor of Example 1, 450 cc of perfluoropropane are introduced at the temperature of −50° C. One operates with the same procedure as in Example 1, by feeding 24.0 Nl/h of oxygen, 12.0 Nl/h of tetrafluoroethylene and 0.042 Nl/h of chlorine diluted in a stream of 2.4 Nl/h of nitrogen. After 300 minutes of reaction 163 g of product are obtained (corresponding to a specific productivity of 72 g/h/l), having PO=3.91 and viscosity equal to 14000 cSt. The NMR analysis indicates a structure similar to that of example 1, with (p+n)/(q+m) ratio=3.08 and n/m=1.87 and molecular weight equal to 40000.

EXAMPLE 4

In the reactor of Example 1,420 cc of perfluoropropane are introduced at the temperature of −60° C. in which 6.5 g of the product obtained in example 1, utilized as reaction activator, were previously diluted. One operates as in Example 1, by feeding 12.0 Nl/h of oxygen, 6.0 Nl/h of TFE and 0.021 Nl/h of chlorotrifluoroethylene diluted in a stream of 0.7 Nl/h of nitrogen. After 240 minutes of reaction 79.5 g of polymer are obtained (corresponding to a specific productivity of 47 g/h/l) , having PO=3.28 and viscosity equal to 4700 cSt.

The NMR analysis indicates a structure similar to that of example 1, with (p+n)/(q+m) ratio=3.07 and n/m=2.01 and average molecular weight equal to 26700.

EXAMPLE 5

In the reactor of Example 1,430 cc of perfluoropropane are introduced at the temperature of −60° C., wherein 7.2 g of product obtained in example 1, used as reaction activator, were previously dissolved. One operates as in Example 1, by feeding 18.0 Nl/h of oxygen, 9.0 Nl/h of TFE and 0.021 Nl/h of chlorotrifluoroethylene diluted in a stream of 0.7 Nl/h of nitrogen. After 240 minutes of reaction, 135.9 g of polymer are obtained (corresponding to a specific productivity of 81 g/h/l), having PO=4.77 and viscosity of about 100000 cSt. The NMR analysis indicates a structure similar to that of example 1, with (p+n)/(q+m) ratio=5.09 e n/m=2.83 and average molecular weight equal to 80000.

We claim:

1. Tetrafluoroethylene oxidation process comprising the step of oxidizing tetrafluoroethylene in solution at temperatures comprised between −80° C. and −40° C. in contact with ultraviolet (UV) radiation and oxygen and perfluoropropane as solvent to obtain peroxidic perfluoropolyethers.

2. Tetrafluoroethylene oxidation process according to claim 1 carried out at temperatures comprised between −70° C. and −50° C.

3. Tetrafluoroethylene oxidation process according to claims 1 and 2, wherein the perfluoropolyethers obtained have the following formula:

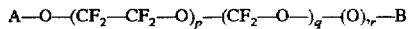

wherein the terminals A and B are equal to or different from each other and comprise —CF$_3$, —COF, —CF$_2$COF, —CF$_2$X wherein X is F or Cl; p, q and r indexes equal to or different from each other are integers;

sum of p+q is a number comprised between 2 and 1000;

q/p ratio is comprised between 0.1 and 10;

r/(p+q) ratio leads to a peroxidic perfluoropolyether having a peroxidic unit (PO) lower than 4.5–5.

4. Tetrafluoroethylene oxidation process according to claim 3, wherein:

the sum of p+q is a number comprised between 10 to 400;

the q/p ratio ranges from 0.2 to 5; the r/(p+q) ratio leads to a peroxidic perfluoropolyether having a PO comprised between 1 and 3.5.

5. Tetrafluoroethylene oxidation process according to claim 1, wherein a tetrafluoroethylene concentration ranges from 0.005 and 1 mole per liter of solution, oxygen partial pressures are comprised between 0.1 and 2 atm.

6. Tetrafluoroethylene oxidation process according to claim 1, wherein the peroxidic perfluoropolyethers are submitted to thermal treatment at temperatures comprised between 100° and 250° C. or by the UV radiation, and optionally in contact with solvents to produce perfluoropolyethers.

7. Tetrafluoroethylene oxidation process according to claim 6, wherein the perfluoropolyethers are submitted to a fluorination treatment to obtain perfluoropolyethers with perfluoroalkylic terminals.

8. Tetrafluoroethylene oxidation process according to claim 6, wherein perfluoropolyethers are submitted to chemical reduction and to subsequent transformation reactions to obtain functional products.

9. Tetrafluoroethylene oxidation process according to claim 8, wherein the functional products are a salt of carboxylic acid, optionally submitted to decarboxylation processes in hydrogen donor substances.

* * * * *